United States Patent
Gregg et al.

(10) Patent No.: US 8,510,509 B2
(45) Date of Patent: Aug. 13, 2013

(54) DATA TRANSFER TO MEMORY OVER AN INPUT/OUTPUT (I/O) INTERCONNECT

(75) Inventors: Thomas A. Gregg, Highland, NY (US); Rajaram B. Krishnamurthy, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1041 days.

(21) Appl. No.: 11/958,418

(22) Filed: Dec. 18, 2007

(65) Prior Publication Data

US 2009/0157977 A1  Jun. 18, 2009

(51) Int. Cl.
G06F 12/00 (2006.01)
G06F 13/00 (2006.01)
G06F 13/28 (2006.01)

(52) U.S. Cl.
USPC ... 711/118; 711/137; 711/141; 711/E12.021; 711/E12.041

(58) Field of Classification Search
USPC ................................. 711/137, 118
See application file for complete search history.

(56) References Cited

U.S. PATENT DOCUMENTS

| | | | |
|---|---|---|---|
| 5,072,369 A | 12/1991 | Theus et al. | |
| 5,119,485 A | 6/1992 | Ledbetter, Jr. et al. | |
| 5,148,526 A * | 9/1992 | Nishimukai et al. | 710/52 |
| 5,228,135 A | 7/1993 | Ikumi | |
| 5,408,629 A | 4/1995 | Tsuchiva et al. | |
| 5,758,149 A * | 5/1998 | Bierma et al. | 1/1 |
| 5,890,014 A * | 3/1999 | Long | 710/8 |
| 5,893,921 A | 4/1999 | Bucher et al. | |
| 5,987,571 A | 11/1999 | Shibata et al. | |
| 6,134,633 A | 10/2000 | Jacobs | |
| 6,173,371 B1 | 1/2001 | Arimilli et al. | |
| 6,178,481 B1 * | 1/2001 | Krueger et al. | 711/122 |
| 6,243,788 B1 | 6/2001 | Franke et al. | |
| 6,269,390 B1 | 7/2001 | Boland | |
| 6,499,116 B1 | 12/2002 | Roth et al. | |
| 6,523,102 B1 * | 2/2003 | Dye et al. | 711/170 |
| 6,546,471 B1 | 4/2003 | Tarui et al. | |
| 6,658,538 B2 | 12/2003 | Arimilli et al. | |
| 6,711,650 B1 | 3/2004 | Bohrer et al. | |
| 6,711,651 B1 * | 3/2004 | Moreno et al. | 711/141 |
| 6,963,953 B2 | 11/2005 | Nakajima | |
| 7,058,936 B2 | 6/2006 | Chilimbi et al. | |

(Continued)

OTHER PUBLICATIONS

U.S. Appl. No. 11/958,424, filed Dec. 18, 2007.

(Continued)

*Primary Examiner* — Sheng-Jen Tsai
(74) *Attorney, Agent, or Firm* — Cantor Colburn LLP; Steven Chiu

(57) ABSTRACT

A method, system, and computer program product for data transfer to memory over an input/output (I/O) interconnect are provided. The method includes reading a mailbox stored on an I/O adapter in response to a request to initiate an I/O transaction. The mailbox stores a directive that defines a condition under which cache injection for data values in the I/O transaction will not be performed. The method also includes embedding a hint into the I/O transaction when the directive in the mailbox matches data received in the request, and executing the I/O transaction. The execution of the I/O transaction causes a system chipset or I/O hub for a processor receiving the I/O transaction, to directly store the data values from the I/O transaction into system memory and to suppress the cache injection of the data values into a cache memory upon presence of the hint in a header of the I/O transaction.

20 Claims, 7 Drawing Sheets

(56) References Cited

U.S. PATENT DOCUMENTS

| | | | |
|---|---|---|---|
| 7,096,322 | B1 | 8/2006 | Sollom et al. |
| 7,155,572 | B2 | 12/2006 | Hughes et al. |
| 7,159,077 | B2 | 1/2007 | Tu et al. |
| 7,162,584 | B2 | 1/2007 | Adl-Tabatabai et al. |
| 2002/0152295 | A1* | 10/2002 | Crowley et al. ............... 709/223 |
| 2003/0009640 | A1* | 1/2003 | Arimilli et al. ............... 711/147 |
| 2004/0128450 | A1 | 7/2004 | Edirisooriya et al. |
| 2005/0240652 | A1 | 10/2005 | Crick |
| 2005/0246500 | A1* | 11/2005 | Iyer et al. ...................... 711/137 |
| 2006/0064518 | A1 | 3/2006 | Bohrer et al. |
| 2006/0080565 | A1* | 4/2006 | Hsieh et al. ................... 713/400 |
| 2006/0085602 | A1 | 4/2006 | Huggahalli et al. |
| 2006/0095679 | A1 | 5/2006 | Edirisooriya |
| 2006/0112238 | A1 | 5/2006 | Jamil et al. |
| 2006/0136671 | A1* | 6/2006 | Balakrishnan et al. ....... 711/122 |
| 2006/0206634 | A1* | 9/2006 | Torisaki et al. ................. 710/22 |
| 2007/0088915 | A1 | 4/2007 | Archambault et al. |
| 2007/0156968 | A1* | 7/2007 | Madukkarumukumana et al. ............................ 711/138 |
| 2008/0059708 | A1 | 3/2008 | Lawson et al. |
| 2008/0065832 | A1* | 3/2008 | Srivastava et al. ............ 711/130 |
| 2008/0104325 | A1* | 5/2008 | Narad et al. ................... 711/122 |
| 2008/0127131 | A1* | 5/2008 | Gao et al. ...................... 717/140 |
| 2008/0229009 | A1* | 9/2008 | Gaither et al. ................ 711/113 |
| 2009/0013224 | A1* | 1/2009 | Ziaja et al. .................... 714/724 |

OTHER PUBLICATIONS

U.S. Appl. No. 11/958,431, filed Dec. 18, 2007.
U.S. Appl. No. 11/958,435, filed Dec. 18, 2007.
U.S. Appl. No. 11/958,440, filed Dec. 18, 2007.
U.S. Appl. No. 11/958,445, filed Dec. 18, 2007.
Leon et al., "Reducing the Impact of the Memory Wall for I/O Using Cache Injection," IEEE, Aug. 2007, pp. 143-149.
Huggahalli et al., "Direct Cache Access for High Bandwidth Network I/O," IEEE, 2005, pp. 1-10.
Milenkovic et al., "Cache Injection on Bus Based Multiprocessors," IEEE, 1998, pp. 1-6.
Leone, et al., "Reducing Memory Badwidth for Chip-Multiprocessors Using Cahe Injection", Computer Science Departmetnt, University of Mexico, 2006, http://www.usenix.org/events/osdi06/posters/leon.pdf, 1 page.
Milenkovic, et al., "Achieving High Performance in Bus-Based Shared Memory Multiprocessors", IEEE Concurencey, 2000, http://www.ecewah.edu/~milenka/docs/milenkovic_conc00.pdf, pp. 36-44.
Regnier, et al., "TCP Onloading for Data Center Servers, Computer", IEEE Comptuer Society, 2004, http://download.intel_com/technology/comms/perfnet/download/tcp_ieee_article.pdf, pp. 46-56.
Khunjush, et al., "Lazy Direct-to-Cache Transfer During Receive Operations in a Message passig Environment", ACM CF'06, p. 331-340, May 3-5, 2006.
Milenkovic, et al., "A Performance Evaluation of Cache Injection in Bus-Based Shared Memory Multiprocessors", University of Alabama in Huntsville, 2002, http://www.ece.uah.eduk~milenka/docs/milenkovic_conc00.pdf, 12 pages.
Google Search for "input/ouput transaction" "bypassing cache" on Feb. 28, 2012.

* cited by examiner

DATA TRANSFER TO MEMORY OVER AN INPUT/OUTPUT (I/O) INTERCONNECT

BACKGROUND OF THE INVENTION

The present disclosure relates generally to data processing, and, in particular, to a method, system, and computer program product for data transfer to memory over an input/output (I/O) interconnect.

In a typical computer system architecture, a bidirectional input/output (I/O) interconnect (e.g., PCI Express) may be used to bring data from an I/O adapter to system memory and a processor complex. If the I/O interconnect contains data for a memory address currently being cached in the processor complex, this data item may be invalidated and the processor then reads the most recent value from memory (updated from the I/O interconnect). The processor complex may use snoopy bus protocols to keep its data coherent or by maintaining a directory that tracks which cache lines are located in each of the processors' caches.

Recently, cache injection or direct cache (or memory) access schemes have been developed. To avoid the memory latency of reading a data item from memory, updated values of cached addresses from an I/O write can be directly injected into processor caches from the I/O interconnect. This adds additional hardware complexity but reduces memory latency. Such techniques are critical in a modem computer system where processor speeds are far greater than memory speeds and cache misses can take thousands of processor cycles.

Many computer systems utilize several processors with hierarchically organized caches and memories. In this environment, the computer system's system chipset or I/O hub typically does not have knowledge of which cache has an I/O write address stored therein. As a result, I/O writes are typically broadcast to all of the caches for injection, whereby the cache with the broadcasted address updates its value. This operation is performed for all addresses and associated data, since the I/O hub has no information regarding the cached addresses in the processor complex. Clearly, this process leads to considerable bandwidth waste, as 'inject'-able values are broadcast even for addresses not cached in any of the processor complex caches. In addition, in a large processor complex, these cache-injection transactions need to keep up with the I/O transaction rates. For massive I/O writes that span gigabytes and terabytes of memory and are unshared or uncached, massive amounts of processor complex bandwidth may be wasted.

In an IBM® System Z™ machine, I/O writes are directed towards the L3 cache. For I/O writes that span several gigabytes to terabytes, this can easily pollute the L3 cache. This problem is compounded when I/O write addresses are not cached in any of the processors' lower-level caches (e.g., L1 or L2) and thus, are not useful for the processor. Additionally, I/O write data could be directed to uncached memory regions or be non-shared between processor caches (e.g., memory hierarchy used as a intermediate buffer without need for processor intervention) where I/O writes to L3 cache are not needed. Such action leads to cache pollution and can manifest itself as processor complex bandwidth wastage.

What is needed, therefore, is a way to avoid cache pollution and bandwidth waste during cache injection from an I/O interconnect in a multiprocessor environment.

BRIEF SUMMARY OF THE INVENTION

Embodiments of the invention include a method for data transfer to memory over an input/output (I/O) interconnect. The method includes reading a mailbox stored on an I/O device in response to a request to initiate an I/O transaction. The mailbox stores a directive that defines a condition under which cache injection for data values in the I/O transaction will not be performed. The method also includes embedding a hint into the I/O transaction when the directive in the mailbox matches data received in the request, and executing the I/O transaction. The execution of the I/O transaction causes a system chipset or an input/output (I/O) hub for a processor receiving the I/O transaction, to directly store the data values from the I/O transaction into system memory and to suppress the cache injection of the data values into a cache memory prompted by the presence of a hint in a header of the I/O transaction.

Additional embodiments include a system for data transfer to memory over an input/output (I/O) interconnect. The system includes an I/O adapter in communication with a chipset having a multiplexer and control, system memory, and a processor complex having a cache control unit. The processor complex includes a hierarchically organized cache and processing units. The system also includes a mailbox stored on the I/O adapter, and logic executing on the I/O adapter. The logic implements a method. The method includes reading the mailbox in response to a request to initiate an input/output (I/O) transaction, the mailbox storing a directive that defines a condition under which cache injection for data values in the I/O transaction will not be performed. The method also includes embedding a hint into the I/O transaction when the directive in the mailbox matches data received in the request. During execution of the I/O transaction, the chipset directly stores the data values from the I/O transaction into the system memory using the multiplexer and suppresses the cache injection of the data values into a cache memory of the processor complex prompted by presence of the hint in a header of the I/O transaction.

Additional embodiments include a computer program product for data transfer to memory over an input/output (I/O) interconnect. The computer program product includes a storage medium readable by a processing circuit and storing instructions for execution by the processing circuit for implementing a method. The method includes reading a mailbox stored on an I/O device in response to a request to initiate an I/O transaction. The mailbox stores a directive that defines a condition under which cache injection for data values in the I/O transaction will not be performed. The method also includes embedding a hint into the I/O transaction when the directive in the mailbox matches data received in the request, and executing the I/O transaction. The execution of the I/O transaction causes a system chipset or an input/output (I/O) hub for a processor receiving the I/O transaction, to directly store the data values from the I/O transaction into system memory and to suppress the cache injection of the data values into a cache memory prompted by the presence of a hint in a header of the I/O transaction.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Exemplary embodiments of the invention relate to processes for implementing data transfer to system memory over an input/output (I/O interconnect). The data transfer to system memory over an I/O interconnect provides the ability to suppress cache injection under defined conditions, as described further in FIGS. 1-5. Cache injection refers to a process by which data values, e.g., in a direct memory access (DMA) write transaction, are directly injected into a hierarchically organized cache system in a broadcast-type manner; that is, incoming traffic, e.g., from a network, is broadcast to each of the caches in the hierarchy, as opposed to the system memory or a subset of the caches. By performing cache injection, subsequent access to the data is quicker, thereby reducing latency associated with accessing the system memory. The cache with the broadcasted address then updates its value. The information is broadcast to each of the caches because the computer system's system chipset or I/O hub typically does not have knowledge of which cache has an I/O write address stored therein. This operation is performed for all addresses and associated data, since the I/O hub has no information regarding the cached addresses in the processor complex. Clearly, this process leads to considerable bandwidth waste, as 'inject'-able values are broadcast even for addresses not cached in any of the processor complex caches. The data transfer to memory processes described herein provide a means for suppressing cache injection under defined conditions, such that cache injection for transactions which meet the criteria in the defined conditions is suppressed. In this instance, the data values for these transactions are stored directly in the system memory, or alternatively, a higher level cache of the hierarchy.

Figure 1:
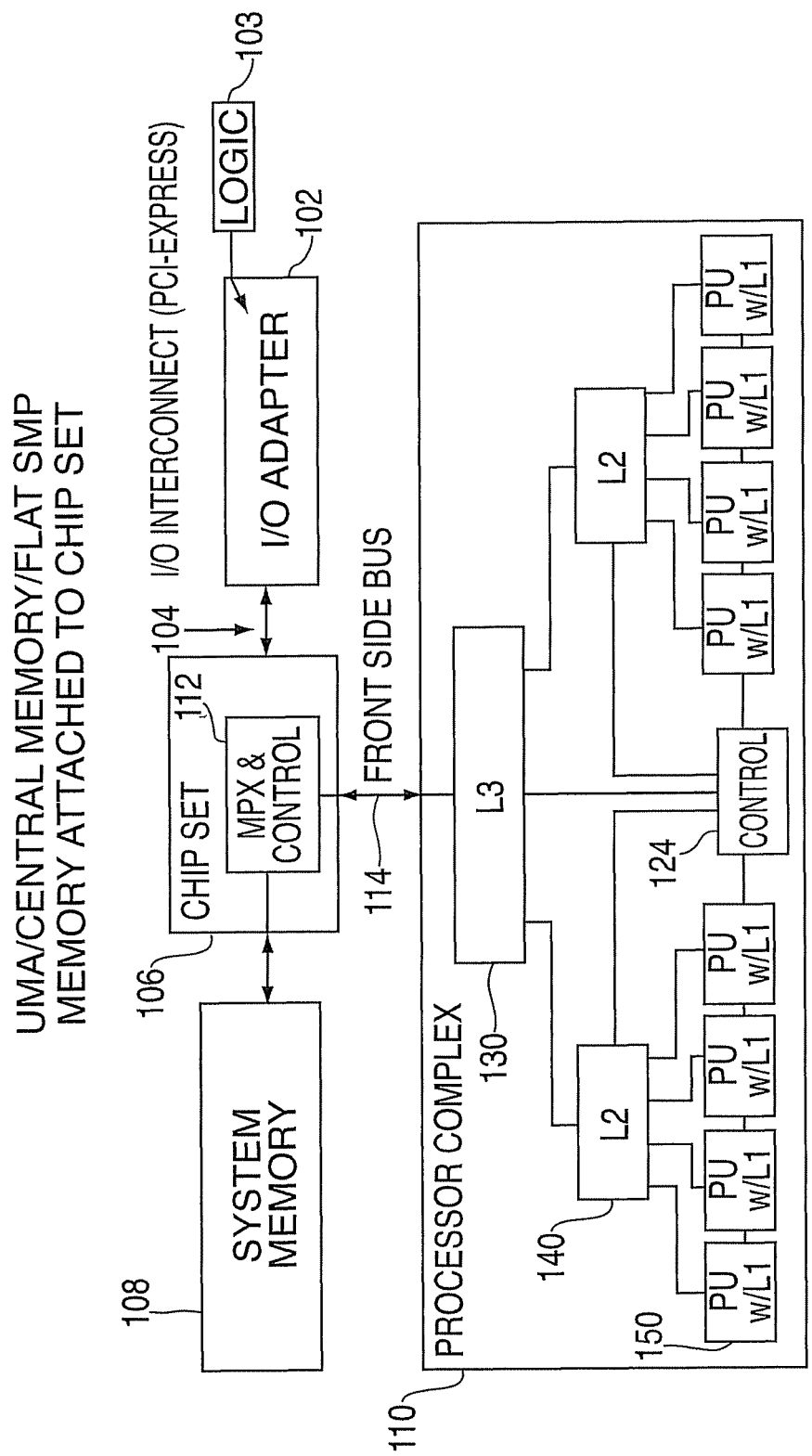
FIG. 1 is a symmetrical multiprocessor architecture (SMP) for use in implementing data transfer to memory over an input/output (I/O) interconnect in accordance with an exemplary embodiment.

Turning now to FIG. 1, an exemplary system for implementing data transfer to memory over an I/O interconnect will now be described. The system of FIG. 1 relates to an SMP architecture in which a system memory 108 is coupled with a system chipset 106 or I/O hub (e.g., a system employing Intel® processors). The system includes an I/O adapter 102 (which, in turn, includes a processor and logic) coupled to the chipset 106 via a bi-directional I/O interconnect 104 (e.g., PCI Express). The chipset 106 is communicatively coupled to the system memory 108 (also referred to herein as main memory). The chipset 106 is also coupled to a processor complex 110 over a front side bus (FSB) 114. The I/O adapter 102 reads/writes data between the chipset 106 and peripheral devices (not shown).

The processor complex 110 includes multiple processing emits, each with a level 1 (L1) cache 150. In the embodiment shown in FIG. 1, the processor complex 110 also includes a level 2 (L2) cache 140 and level 3 (L3) cache 130. The levels 130, 140, and 150 of cache represent a storage hierarchy of the processor complex 110. L3 represents a highest cache level (highest memory latency), and L1 represents a lowest cache level (lowest memory latency) in the hierarchy. It will be understood that any number of cache levels may be implemented in order to realize the advantages of the invention. Three levels L1-L3 are provided for illustrative purposes only and are not to be construed as limiting in scope. In addition, as shown in FIG. 1 for illustrative purposes, multiple processing units (PUs) or groups of processing units may share a common Level 2 and Level 3 storage space in the cache hierarchy.

The processor complex 110 also includes a cache control unit 124 which manages the traffic (e.g., data transfers) associated with transactions occurring within the complex 110 with respect to the cache hierarchy L1-L3. For example, cache control unit 124 toggles access to required caches when data reads or writes to/from caches is required.

The chipset 106 may include a group of integrated circuits (chips) that work together to perform various tasks. In an exemplary embodiment, the chipset 106 includes a multiplexer (MPX) and controller 112 for directing the traffic associated with transactions occurring among the I/O adapter 102, the system memory 108, and the processor complex 110 (e.g., read and write transactions). While the embodiment described in FIG. 1 is directed to a chipset 106, it will be understood that other devices may be utilized in implementing the data transfer to memory processes (e.g., cards, boards, etc.).

As described above, conventional systems perform cache injection by broadcasting data values of a transaction to each of the caches in a hierarchically organized cache system. This is reflected in FIG. 1 by the solid lines directly interconnecting MPX 112 to L3, L3 to L2, and L2 to L1. The data transfer to memory processes described in these exemplary embodiments utilize logic 103 executing in the I/O adapter 102 (e.g., software/firmware) to suppress the cache injection whereby the data to be transferred is injected directly into the system memory 108 (or higher level cache L3), as shown e.g., by the solid line between the chipset 106 and system memory 108, as well as by the front side bus 114 between the MPX & Control 112 and the L3 cache 130.

Figure 2:
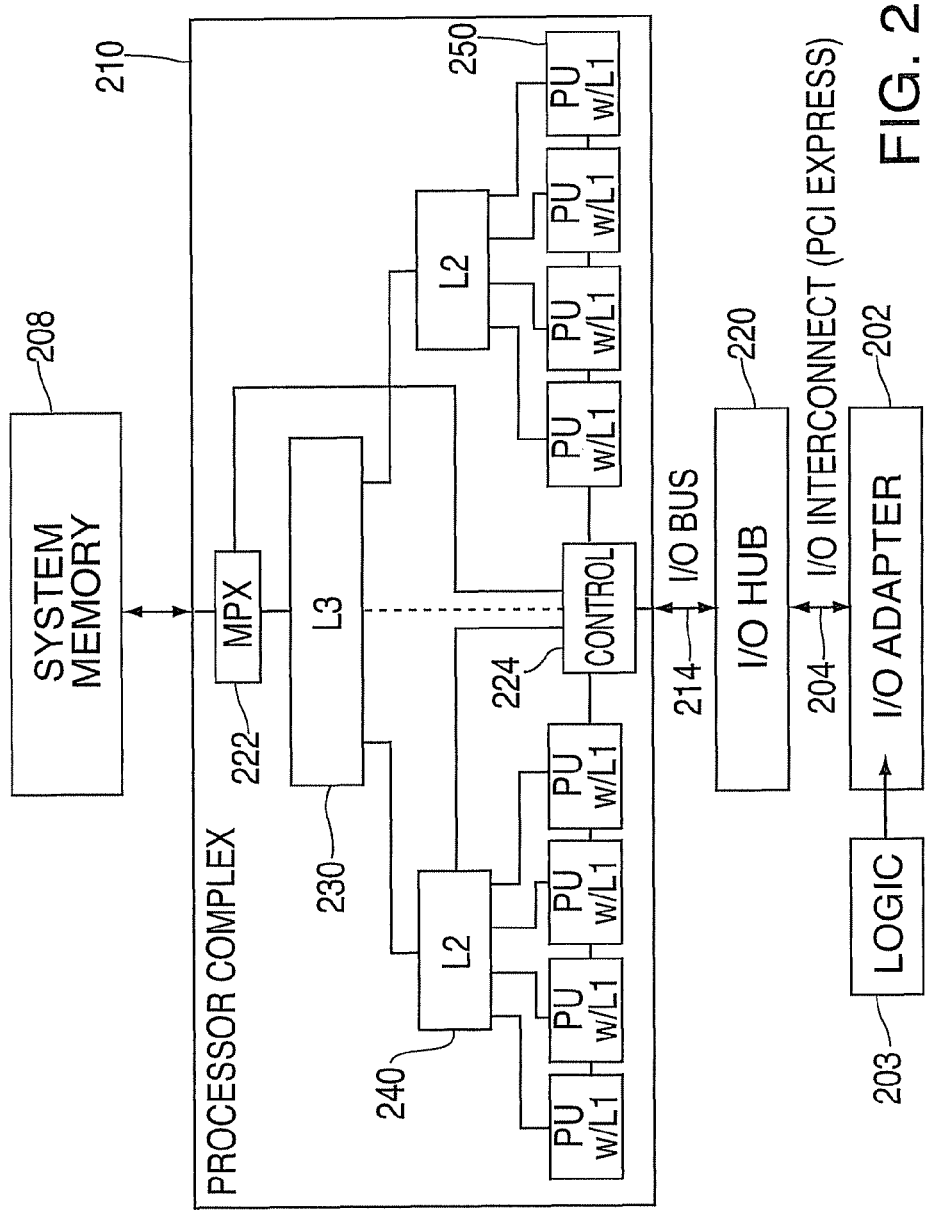
FIG. 2 is a symmetrical multiprocessor architecture (SMP) for use in implementing data transfer to memory over an I/O interconnect in accordance with another exemplary embodiment.

Turning now to FIG. 2, a system upon which the data transfer to memory over an I/O interconnect may be implemented in accordance with another exemplary embodiment will now be described. The system of FIG. 2 relates to an SMP architecture in which a system memory 208 is coupled with a processor complex 210 (e.g., a system employing AMD® processors or IBM® System p™ and System z™ processors). Various components of the system of FIG. 2 overlap in function with components described above in FIG. 1. To this extent, these components and/or functions will not be described in detail. The system of FIG. 2 includes an I/O adapter 202 in communication with an I/O hub 220 over an I/O interconnect 204 (e.g., PCIe). The I/O hub 220 is communicatively coupled to the processor complex 210 via an I/O bus 214. The processor complex 210, likewise, is communicatively coupled to the system memory 208 (also referred to as main memory). The processor complex 210 includes a cache hierarchy with three levels of cache, namely L1 250, L2 240, and L3 230. The I/O hub 220 communicates with the processor complex 210 via a cache control unit 224 which directs and controls data traffic between the I/O hub 220, the cache hierarchy, and the system memory 208 via a multiplexer 222.

The I/O adapter 202 reads/writes data to the processor complex 210 and the system memory 208 via the I/O interconnect 204, I/O hub 220, I/O bus 214 and MPX 222. For example, in a conventional cache injection process, the data transaction or request is generated in the I/O adapter 102 and distributed over the I/O interconnect 204 to the I/O hub 220 using, e.g., PCI Express protocols. The I/O hub 220 performs a translation (e.g., transforming the PCI Express protocols to those in which the I/O bus 214 will understand) and distributes the translated data over the I/O bus 214 to the L3 cache 230 under control of the cache control unit 224. The data transfer to memory processes of the exemplary embodiments utilize logic 203 executing in on the I/O adapter 202 (e.g., software/firmware) and control unit 224 to provide a unique path from I/O hub 220 directly to system memory. In an exemplary embodiment, the data transfer to memory processes provide a hint in the transaction, which informs the MPX 222 to steer the transaction to system memory as opposed to the L3 cache 230.

Figure 3:
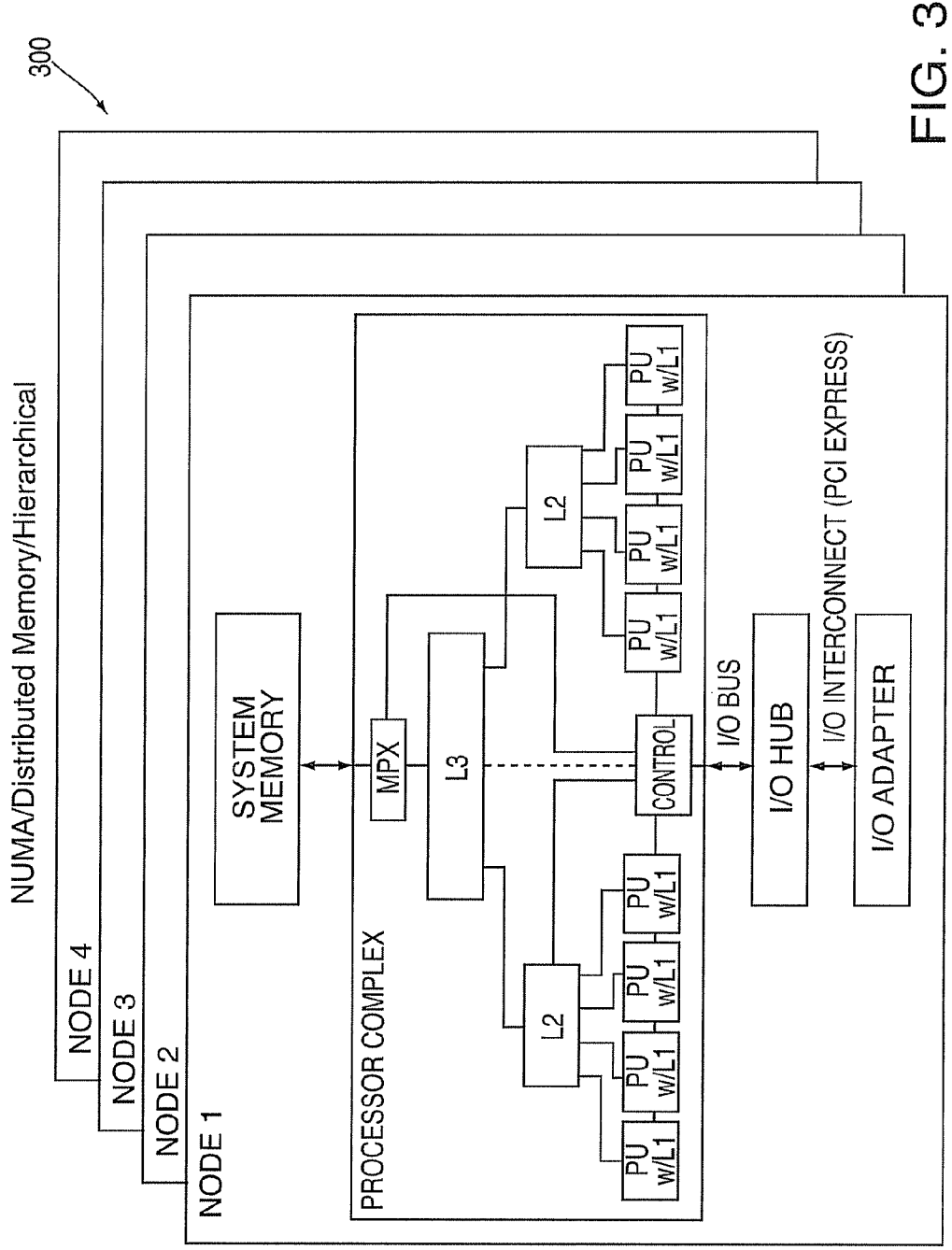
FIG. 3 is a non-uniform memory access (NUMA) architecture with distributed memory for use in implementing data transfer to memory over an I/O interconnect in accordance with yet another exemplary embodiment.

Turning now to FIG. 3, a non-uniform memory access (NUMA) architecture with distributed memory for use in implementing direct cache injection management will now be described. The system of FIG. 3 includes multiple nodes 300 (Nodes 1-4), which communicate among one another for performing data transactions including the data transfer to memory processes described herein. Each of the Nodes 1-4 may include a multiplexer (MPX) (e.g., MPX 222) that steers data to system memory or cache hierarchy in the processor complex. The processor complex for each of Nodes 1-4 are interconnected and communicate with one another to form the NUMA, or distributed, memory machine. Keeping data values coherent in the caches may be implemented, e.g., using scalable directory-based cache coherency techniques or snoopy bus protocols. Cache injection or its converse, i.e., direct transfer to memory is still possible in the NUMA architecture of FIG. 3. Cache lines of Node 1 that are cached remotely in Node 3 (for example), can also be directly updated through cache injection of a device attached to Node 1. This is possible because directory information related to local and remote cache lines is stored in Node 1 and can be used in conjunction with directory based cache coherence protocols. It will be understood that the direct cache injection management processes may be implemented over a system that includes multiple nodes in an SMP architecture as shown, e.g., in FIG. 1 as well. For example, multiple nodes may be interconnected via chipsets of each of the nodes.

In an exemplary embodiment, the data transfer to memory over an I/O interconnect is enabled by the carriage of a "hint" along with each data transaction (e.g., transaction burst). This hint is referred to herein as "NO_INJECT." In the I/O interconnect 104/204, e.g., PCI Express, a transaction layer thereof generates header and data for the transaction. The transaction layer header carries this information for memory write PCI transactions. When the transaction (which includes the "hint") reaches the system chipset 106 of FIG. 1, the chipset 106 directs the entire transaction to the memory 108 using MPX 112 without causing any cache injection traffic in the processor complex 110. This causes fewer resources to be used in the system and reduces the interconnect utilization of the processor complex 110.

Alternatively, as shown in FIG. 2, when the transaction (which includes the "hint") reaches processor complex 210 of FIG. 2, the I/O hub 224 directs the entire transaction to the memory 208 using MPX 222 without causing any cache injection traffic in the processor complex 210. This flow is represented in FIG. 2 as line 260.

This process may be useful for various transaction types. For example, long data typically spans several cache lines. It may be useful to inject just the first-critical-cache-line (or first few cache lines) and write the rest of the long data to memory (or to higher order caches, such as L3 130/230). The long nature of the data will hide the startup access latency to memory. An example of such a transaction is packet data entering the computer system from an external network. The header can be injected into the cache and payload data may be steered to memory.

Other transaction types that may benefit from this process include bulk data and non-shared data. Bulk data is data that spans several cache sizes, often gigabytes to terabytes of data. In such cases, cache injection is not necessary as the startup latency of cache access can be amortized over the entire transfer. For non-shared data that does not exhibit producer-consumer relationships or reader-writer access patterns between the I/O device and memory (or other processors), broadcasting injection data over the processor complex interconnect (e.g., 114/214) is wasteful. Instead, non-shared data transactions may carry the "NO_INJECT" hint to allow direct passage to memory 108/208 without injecting transactions into the processor complex 110/210. Examples of this may include data that will be used in the future when the current phase of computation is completed, disk storage-to-disk storage copies that use main memory 108/208 as a buffering medium, and I/O writes to non-cached regions (e.g., used in real-time systems to avoid cache variability, relational databases).

Figure 4:
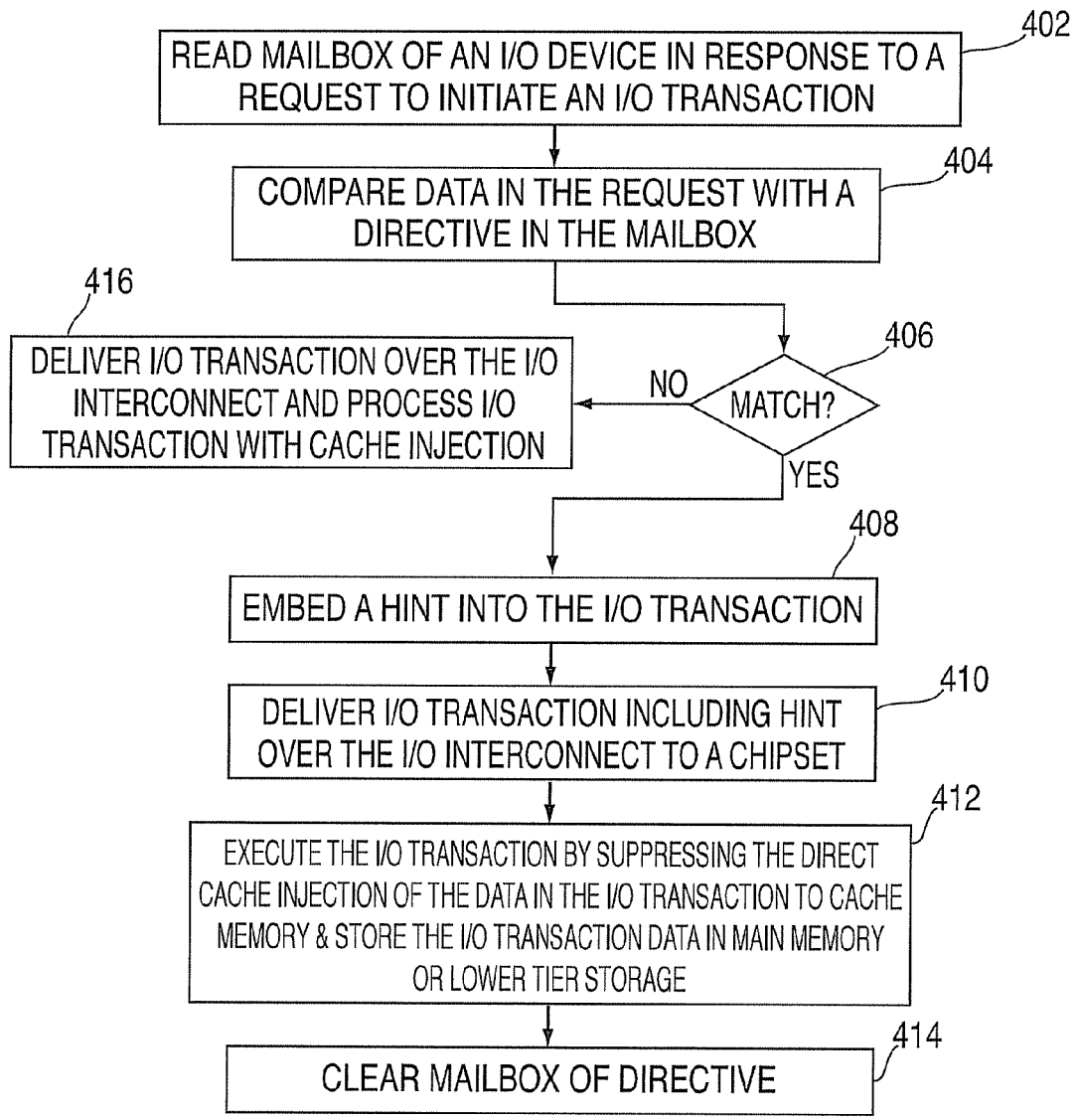
FIG. 4 is a flow diagram describing a process for implementing data transfer to memory over an input/output (I/O) interconnect in accordance with an exemplary embodiment.
Figure 5:
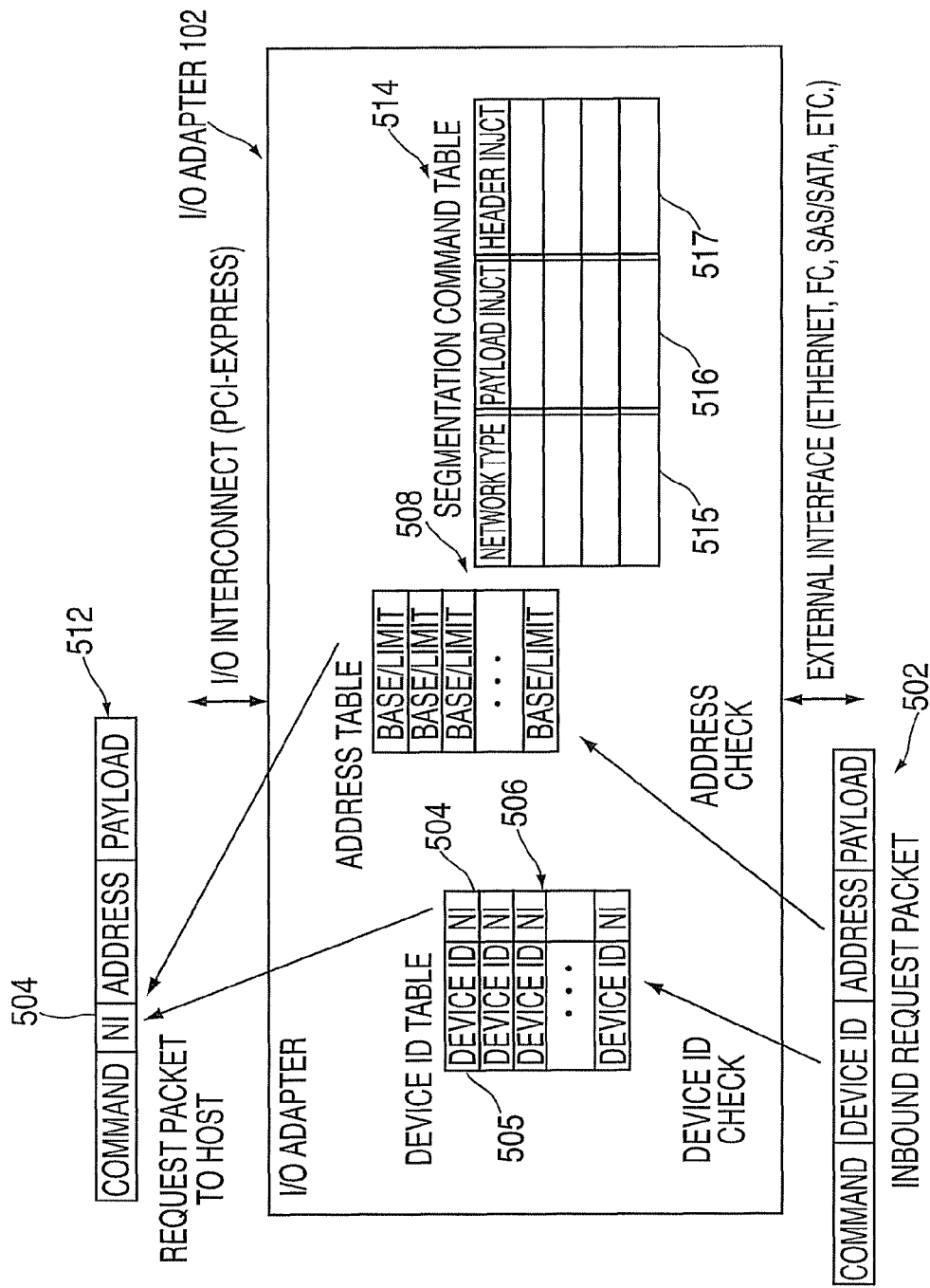
FIG. 5 is a block diagram describing components of an input/output (I/O) adapter used in the system of FIG. 1 for implementing data transfer to memory in accordance with an exemplary embodiment.

Turning now to FIGS. 4 and 5, an I/O adapter and process for implementing the data transfer to memory processes will now be described in exemplary embodiments. For purposes of illustration, the process described in FIG. 4 relate to the adapter 102 of FIG. 1.

At step 402, the I/O device (e.g., I/O adapter 102 or peripheral device), via logic 103 executing thereon, reads a mailbox stored in its memory in response to a request 502 to initiate an I/O transaction (e.g., read or write operation). The request 502 may include a command, a device ID, an address, and a payload. The request 502 is referred to herein as an inbound request packet (e.g., prior to addition of the hint). The mailbox stores a directive that defines a condition under which direct cache injection for data values in the I/O transaction will not be performed (i.e., suppressed). The mailbox may be implemented in a defined storage location (e.g., contiguous memory locations, a plurality of registers in a register set, etc.). As shown in FIG. 5, the mailbox may comprise a Device ID table 506 and an address table 508.

The directive in the mailbox is compared with data received in the request 502 at step 404. The directives may include, e.g., an address range (implemented via the address table 508), a hint counter, a device identifier of the I/O device (implemented via the device ID table 506), a device identifier of a remote device, payload (e.g., payload of an incoming packet into the I/O adapter from an external source), packet type (e.g., a packet type of an incoming packet into the I/O device from an external source), and header of an incoming transaction (e.g., inbound request packet 502). The device identifier of the I/O device may utilize one of a switched PCIe slot or a virtualized adapter criteria as the conditions. For example, a single physical adapter may be virtualized into several virtual adapters for the purposes of utilization and partitioning, each such virtual adapter being granted a separate device ID. In one embodiment, the address in the request 502 is compared to the entries in the address table 508. The address table 508 may include a base and limit (e.g., low end of address and high end of address) and may be implemented using, e.g., associative lookup. In another embodiment, a device identifier in the request 502 is compared to the Device ID table 506. As shown in FIG. 5, an NI bit (NO Inject) 504 is used to define which device identifiers should be triggered for cache injection suppression. In yet another embodiment of the present invention, a segmented command table 514 (FIG. 5) holds fields for network type (Ethernet, SCSI, Infiniband) 515, inject payload command field 516, and inject header command field 517, as described further herein.

At step 406, it is determined whether in response to the comparison, a match between the data in the request 502 and a directive in the mailbox is found. For example, using the address table 508 for the comparison, if the address in the request 502 falls within limits of a base/limit in the address table 508, at step 406, the I/O device embeds a hint into the I/O transaction to suppress cache injection. Alternatively, using the device ID table 506 for the comparison, if the device ID in the request 502 matches a device ID in the device ID table 506, the I/O device embeds a hint into the I/O transaction. As described above, the hint is a "NO_INJECT" hint, represented, e.g., as a bit 504 in the device ID table 506 and I/O transaction 512. The I/O transaction 512 generated by the I/O adapter 102 includes the command, the NO_INJECT bit 504, address, and payload. In an alternative embodiment, if command table 514 is used for the comparison step described above, the network type (SCSI, Ethernet, Infiniband) of inbound request packet 502 is compared to network type field 515. If a match is found, the payload inject command field 516 and the header inject command field 517 are used to create request packets to host 512 with NO_INJECT bit 504 suitably set. For example, if payload command field 516 is set to "one" and header command field 517 is set to "zero", a request packet to host with NI bit 504 set to "one" (i.e. "no inject") will be created along with another request packet to host with NI bit 504 set to "zero" (i.e., "inject") respectively.

At step 410, the I/O transaction, along with the embedded hint 504, are delivered over the I/O interconnect 104 to the system chipset 106 (or I/O hub 220) which executes the I/O transaction 512 at step 412. The execution of the I/O transaction 512 causes the system chipset 106 for the processor receiving the I/O transaction 512 to directly store the data values (i.e., payload) in the I/O transaction 512 to system memory 108 (or to higher level L3 cache) and to suppress the cache injection of the data values into the cache memory (or lower level L1/L2 caches) prompted by the presence of an embedded hint 504 in a header of the I/O transaction 504. This step may be performed by the cache control unit 124/224 and the multiplexer 112/222, shown in FIGS. 1 and 2.

At step 414, the mailbox is cleared of the directive upon execution of the I/O transaction 512. This may be implemented using a variety of techniques. For example, the mailbox may be cleared by a command from the target processor (e.g., one of the processing units in the L1 cache hierarchy 150) upon completion of a single execution of the I/O transaction 512. Alternatively, the directive may be automatically cleared from the mailbox once it is read by the I/O device. In a further embodiment, a hint counter may be used to track the directives in a mailbox. The directive is active for non-zero values of a counter which is decremented each time the directive is read. In a further embodiment, each directive is persistent until it is cleared by application, system or operating system software, e.g., when a process or address space is swapped out from a processor.

Turning back to step 406, if the directive in the mailbox does not match the data in the request (e.g., address range, device ID, payload, etc.), then the I/O transaction 512 (without the hint) is delivered to the system chipset 106 (or I/O hub 220 and control 224 of FIG. 2) at step 416, which executes the I/O transaction 512 by performing direct cache injection (e.g., injecting the data values from the I/O transaction 512 into all caches (or highest level cache) in the processor complex 110) at step 416.

The directive may be provided to the I/O device by a processor on a system where the I/O device exists (e.g., one of the processing units in complex 110), a processor on a system other than where the I/O device exists, the I/O device where the mailbox exists (e.g., the I/O adapter 102), another IO device within the same system or an I/O device on a system other than where the I/O device exists.

Figure 6:
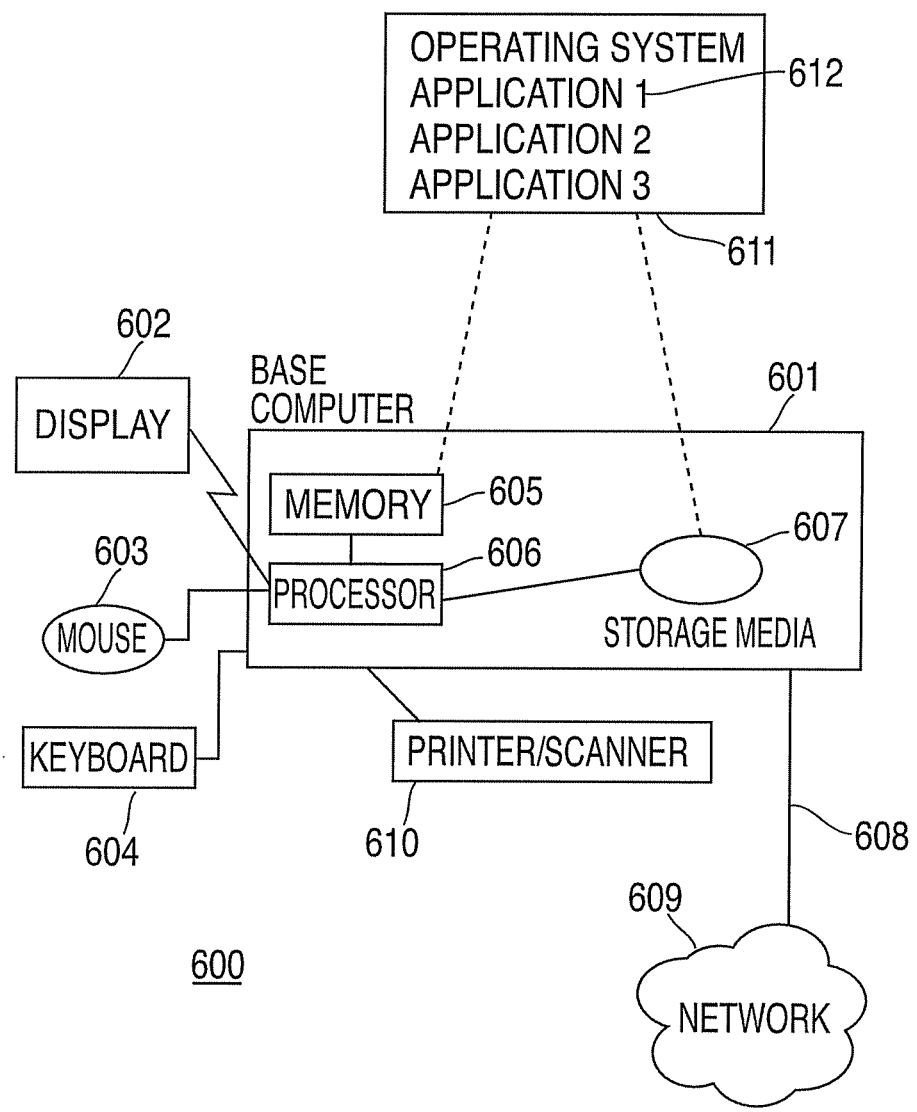
FIG. 6 is a workstation for implementing data transfer to memory processes in accordance with an exemplary embodiment.

FIG. 6 illustrates a representative workstation or server hardware system in which the present invention may be practiced. The system 600 of FIG. 6 comprises a representative computer system 601, such as a personal computer, a workstation or a server, including optional peripheral devices. The workstation 601 includes one or more processors 606 and a bus employed to connect and enable communication between the processor(s) 606 and the other components of the system 601 in accordance with known techniques. The bus connects the processor 606 to memory 605 and long-term storage 607 which can include a hard drive, diskette drive or tape drive for example. The system 601 might also include a user interface adapter, which connects the microprocessor 606 via the bus to one or more interface devices, such as a keyboard 604, mouse 603, a printer/scanner 610 and/or other interface devices, which can be any user interface device, such as a touch sensitive screen, digitized entry pad, etc. The bus also connects a display device 602, such as an LCD screen or monitor, to the microprocessor 606 via a display adapter.

The system 601 may communicate with other computers or networks of computers by way of a network adapter capable of communicating 608 with a network 609. Example network adapters are communications channels, token ring, Ethernet or modems. Alternatively, the workstation 601 may communicate using a wireless interface, such as a CDPD (cellular digital packet data) card. The workstation 601 may be associated with such other computers in a Local Area Network (LAN) or a Wide Area Network (WAN), or the workstation 601 can be a client in a client/server arrangement with another computer, etc. All of these configurations, as well as the appropriate communications hardware and software, are known in the art.

Figure 7:
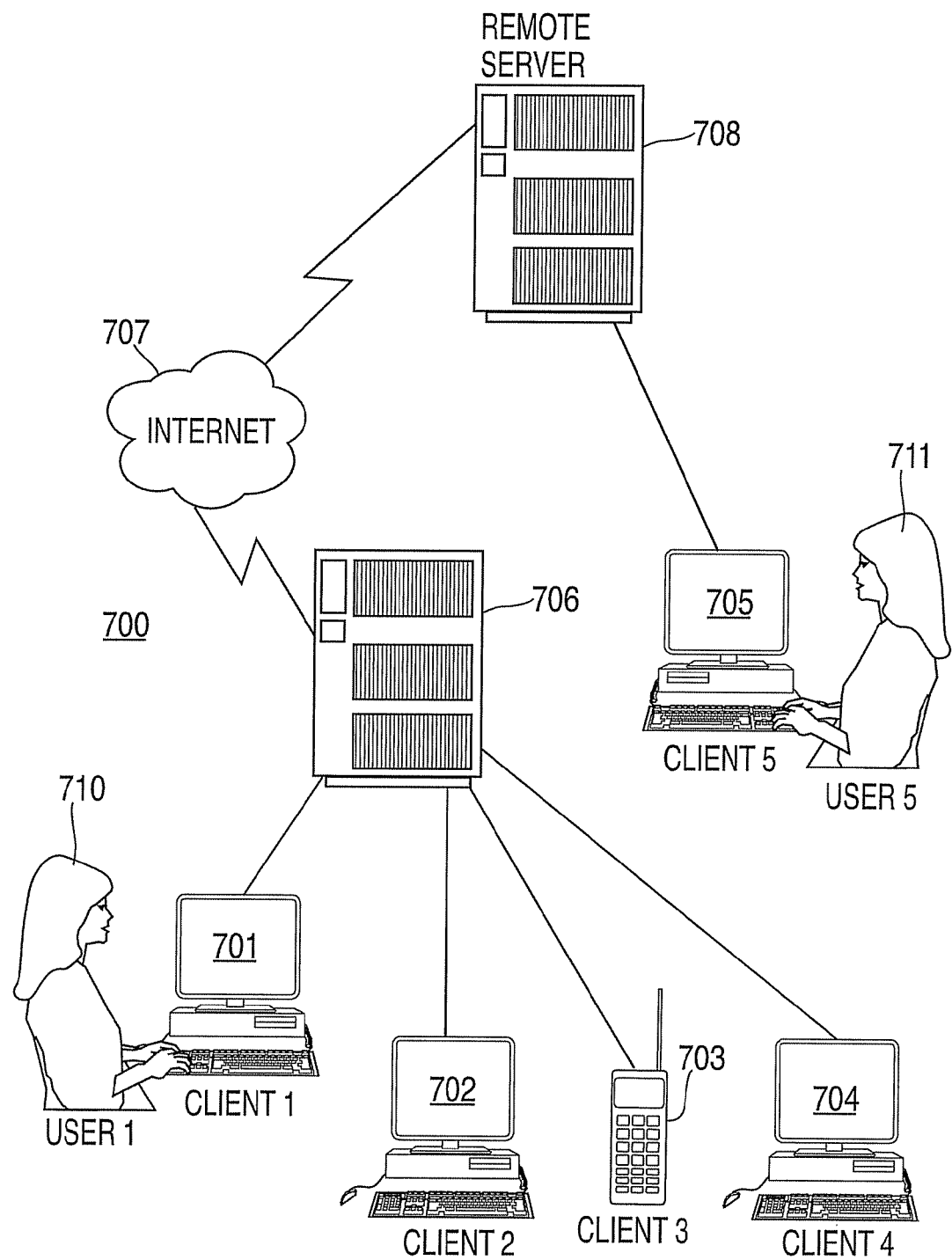
FIG. 7 is a data processing network for implementing data transfer to memory processes in accordance with an exemplary embodiment.

FIG. 7 illustrates a data processing network 700 in which the present invention may be practiced. The data processing network 700 may include a plurality of individual networks, such as a wireless network and a wired network, each of which may include a plurality of individual workstations 601, 701, 702, 703, and 704. Additionally, as those skilled in the art will appreciate, one or more LANs may be included, where a LAN may comprise a plurality of intelligent workstations coupled to a host processor.

Still referring to FIG. 7, the network may also include mainframe computers or servers, such as a gateway computer (client server 706) or application server (remote server 708 which may access a data repository and may also be accessed directly from a workstation 705). The gateway computer 706 serves as a point of entry into each network 707. A gateway is needed when connecting one networking protocol to another. The gateway 706 may be preferably coupled to another network (the Internet 707 for example) by means of a communications link. The gateway 706 may also be directly coupled to one or more workstations 601, 701, 702, 703, and 704 using a communications link. The gateway computer may be implemented utilizing an IBM eServer zSeries® 600 Server available from IBM Corp.

Software programming code which embodies the present invention is typically accessed by the processor 606 of the system 601 from long-term storage media 607, such as a CD-ROM drive or hard drive. The software programming code may be embodied on any of a variety of known media for use with a data processing system, such as a diskette, hard drive, or CD-ROM. The code may be distributed on such media, or may be distributed to users 710, 711 from the memory or storage of one computer system over a network to other computer systems for use by users of such other systems.

Alternatively, the programming code 611 may be embodied in the memory 605, and accessed by the processor 606 using the processor bus. Such programming code includes an operating system which controls the function and interaction of the various computer components and one or more application programs 612. Program code is normally paged from dense storage media 607 to high-speed memory 605 where it is available for processing by the processor 606. The techniques and methods for embodying software programming code in memory, on physical media, and/or distributing software code via networks are well known and will not be further discussed herein.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for data transfer to memory over an input/output (I/O) interconnect, comprising:
    reading a mailbox stored on an input/output (I/O) device in response to a request to initiate an input/output (I/O) transaction, the I/O device external to all hub devices and the mailbox storing a directive that defines a condition under which cache injection for data values in the I/O transaction will not be performed;
    embedding a hint into the I/O transaction when the directive in the mailbox matches data received in the request; and
    executing the I/O transaction;
    wherein execution of the I/O transaction causes a system chipset or an input/output (I/O) hub, for a processor receiving the I/O transaction, to directly store the data values from the I/O transaction into system memory and to suppress the cache injection of the data values into a cache memory, the suppression of the cache injection occurring responsive to detecting the hint in a header of the I/O transaction and without disabling the cache memory.

2. The method of claim 1, wherein directives that define conditions under which cache injection will not be performed include an address range.

3. The method of claim 1, wherein directives that define conditions under which cache injection will not be performed include at least one of:
    a hint counter;
    a device identifier of the I/O device;
    a device identifier of a remote device;
    a payload of an incoming packet into the I/O device from a source external to the I/O device;
    a packet type of an incoming packet into the I/O device from a source external to the I/O device; and
    a header section of an incoming packet into the I/O device from a source external to the I/O device.

4. The method of claim 3, wherein the device identifier of the I/O device utilizes one of switched I/O interconnect slots and virtualized adapter criteria as the conditions.

5. The method of claim 1, wherein the directive is provided to the I/O device by at least one of:
    a processor on a system where the I/O device exists;
    a processor on a system other than where the I/O device exists;
    the I/O device where the mailbox exists; and
    an I/O device on a system other than where the I/O device exists;
    wherein the mailbox is implemented in a defined storage location as one of:
    contiguous memory locations; and
    a plurality of registers in a register set.

6. The method of claim 1, further comprising:
    clearing the mailbox of the directive upon one of:
    a single execution of the I/O transaction;
    expiration of count values of a hint counter;
    processes of an application that are swapped out of physical memory; and a process of the application that ejects the directive from the I/O device during execution of the application.

7. The method of claim 1, further comprising loading the mailbox with the directives, a priori, by an application implementing a process that utilizes the mailbox.

8. The method of claim 1, wherein the data values are steered to one of the system memory and the cache memory by a control unit and multiplexer located in a processor complex, the processor complex communicatively connected to one of the processor or the system chipset.

9. A system for data transfer to memory over an input/output (I/O) interconnect, comprising:
an input/output (I/O) adapter external to all hub devices in communication with a chipset having a multiplexer and control unit, system memory, and a processor complex having a cache control unit, the processor complex comprising a hierarchically organized cache and processing units;
a mailbox stored on the I/O adapter; and
logic executing on the I/O adapter, the logic performing:
reading the mailbox in response to a request to initiate an input/output (I/O) transaction, the mailbox storing a directive that defines a condition under which cache injection for data values in the I/O transaction will not be performed; and
embedding a hint into the I/O transaction when the directive in the mailbox matches data received in the request;
wherein the chipset executes the I/O transaction by directly storing the data values from the I/O transaction into the system memory using the multiplexer and suppressing the cache injection of the data values into a cache memory of the processor complex, the suppression of the cache injection occurring responsive to detecting the hint in a header of the I/O transaction and without disabling the cache memory.

10. The system of claim 9, wherein directives that define conditions under which cache injection will not be performed include an address range.

11. The system of claim 9, wherein directives that define conditions under which cache injection will not be performed include at least one of:
a hint counter;
a device identifier of the I/O adapter;
a device identifier of a remote device;
a payload of an incoming packet into the I/O adapter from a source external to the I/O adapter;
a packet type of an incoming packet into the I/O adapter from a source external to the I/O adapter; and
a header section of an incoming packet into the I/O adapter from a source external to the I/O adapter.

12. The system of claim 11, wherein the device identifier of the I/O adapter utilizes one of switched I/O interconnect slots and virtualized adapter criteria as the conditions.

13. The system of claim 9, wherein the directive is provided to the I/O adapter by at least one of:
a processor on a system where the I/O adapter exists;
a processor on a system other than where the I/O adapter exists;
the I/O adapter where the mailbox exists; and
an I/O adapter on a system other than where the I/O adapter exists;
wherein the mailbox is implemented in a defined storage location as one of:
contiguous memory locations; and
a plurality of registers in a register set.

14. The system of claim 9, wherein a processor in the processor complex clears the mailbox of the directive upon one of:
a single execution of the I/O transaction;
expiration of count values of a hint counter;
processes of an application that are swapped out of physical memory; and
a process of the application that ejects the directive from the I/O adapter during execution of the application.

15. The system of claim 9, wherein the data values are steered to one of the system memory and the cache memory by the mutiplexer and control unit of the chipset.

16. A computer program product for data transfer to memory over an input/out (I/O) interconnect, the computer program product comprising:
a storage medium readable by a processing circuit and storing instructions for execution by the processing circuit for implementing a method, the method comprising:
reading a mailbox stored on an input/output (I/O) device in response to a request to initiate an input/output (I/O) transaction, the I/O device external to all hub devices and the mailbox storing a directive that defines a condition under which cache injection for data values in the I/O transaction will not be performed;
embedding a hint into the I/O transaction when the directive in the mailbox matches data received in the request; and
executing the I/O transaction;
wherein execution of the I/O transaction causes a system chipset or an input/output (I/O) hub, for a processor receiving the I/O transaction, to directly store the data values from the I/O transaction into system memory and to suppress the cache injection of the data values into a cache memory, the suppression of the cache injection occurring responsive to detecting the hint in a header of the I/O transaction and without disabling the cache memory.

17. The computer program product of claim 16, wherein directives that define conditions under which cache injection will not be performed include an address range.

18. The computer program product of claim 16, wherein directives that define conditions under which cache injection will not be performed include at least one of:
a hint counter;
a device identifier of the I/O device;
a device identifier of a remote device;
a payload of an incoming packet into the I/O device from a source external to the I/O device;
a packet type of an incoming packet into the I/O device from a source external to the I/O device; and
a header section of an incoming packet into the I/O device from a source external to the I/O device.

19. The computer program product of claim 18, wherein the device identifier of the I/O device utilizes one of switched I/O interconnect slots and virtualized adapter criteria as the conditions.

20. The computer program product of claim 16, wherein the directive is provided to the I/O device by at least one of:
a processor on a system where the I/O device exists;
a processor on a system other than where the I/O device exists;
the I/O device where the mailbox exists; and
an I/O device on a system other than where the I/O device exists;
wherein the mailbox is implemented in a defined storage location as one of:
contiguous memory locations; and
a plurality of registers in a register set.

* * * * *